(12) United States Patent
Kunert

(10) Patent No.: US 6,589,613 B1
(45) Date of Patent: Jul. 8, 2003

(54) INSULATING GLASS ELEMENT FOR GLAZING A BUILDING

(76) Inventor: Heinz Kunert, Am Krieler Dom 23, D-50935 Koln (DE)

( * ) Notice: Subject to any disclaimer, the term of this patent is extended or adjusted under 35 U.S.C. 154(b) by 105 days.

(21) Appl. No.: 09/716,307

(22) Filed: Nov. 20, 2000

(51) Int. Cl.$^7$ .............................. E06B 3/24; E04C 2/54
(52) U.S. Cl. ........................................ 428/34; 52/786.1
(58) Field of Search ...................... 428/34, 213, 913.3, 428/913, 215; 52/786.1

(56) References Cited

U.S. PATENT DOCUMENTS

| | | | | |
|---|---|---|---|---|
| 3,679,527 A | * | 7/1972 | Crick | 428/34 |
| 3,783,084 A | * | 1/1974 | Quenett | 428/34 |
| 4,019,295 A | | 4/1977 | Derner | 52/171 |
| 4,047,351 A | | 9/1977 | Derner | 52/616 |
| 4,687,687 A | * | 8/1987 | Terneu et al. | 428/34 |
| 4,941,302 A | * | 7/1990 | Barry | 428/34 |
| 5,092,101 A | | 3/1992 | Kunert | |
| 5,154,953 A | * | 10/1992 | Moncuit et al. | 428/34 |
| 5,398,446 A | | 3/1995 | Kunert | 49/169 |

FOREIGN PATENT DOCUMENTS

| | | | |
|---|---|---|---|
| DE | 2542441 | 3/1977 | 27/12 |
| DE | 2559720 | 8/1977 | 27/12 |
| DE | 2829523 | 1/1980 | 3/66 |
| DE | 2842045 | 4/1980 | |
| DE | 9014083.4 | 3/1992 | 27/12 |
| DE | 4125834 | 2/1993 | 3/50 |
| DE | 4401675 | 8/1995 | |
| DE | 19829480 | 1/2000 | 3/67 |
| EP | 0978620 | 2/2000 | 3/66 |
| GB | 1522075 | 8/1978 | 5/10 |

* cited by examiner

Primary Examiner—Donald J. Loney
(74) Attorney, Agent, or Firm—Ostrolenk, Faber, Gerb & Soffen, LLP

(57) ABSTRACT

An insulating glass element for glazing a building, comprising a clear glass pane and a glass pane arrangement which is arranged at a distance from the former, is predominantly absorptive in the non-visible region of the solar radiation spectrum and has a high thermal storage capacity.

23 Claims, 1 Drawing Sheet

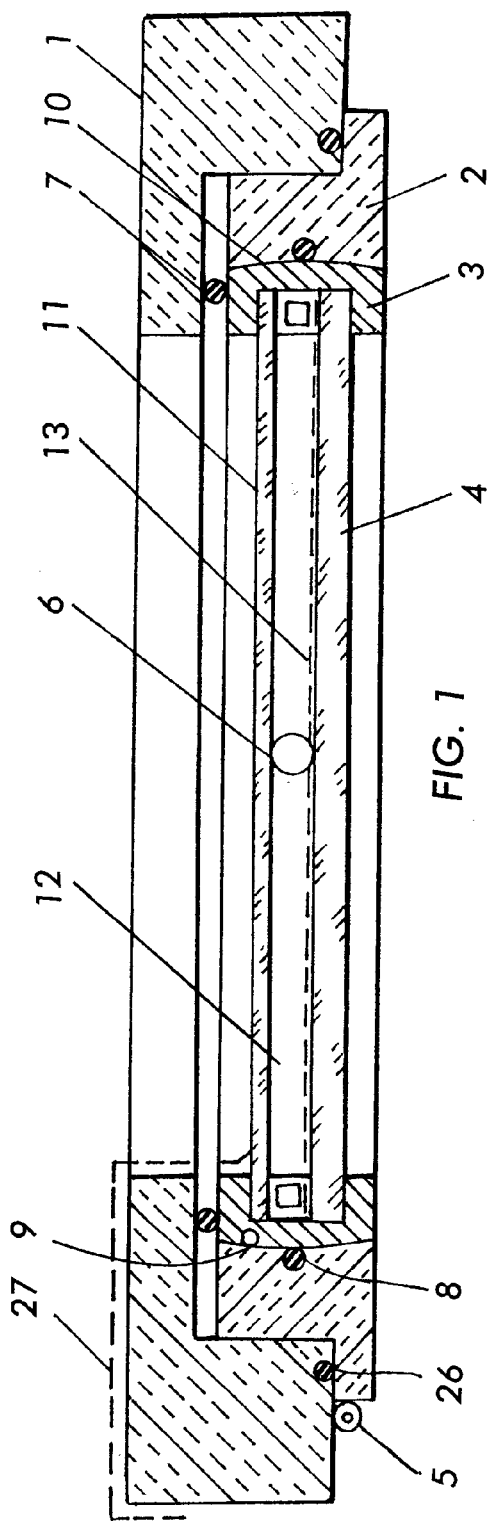
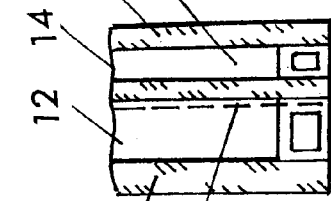
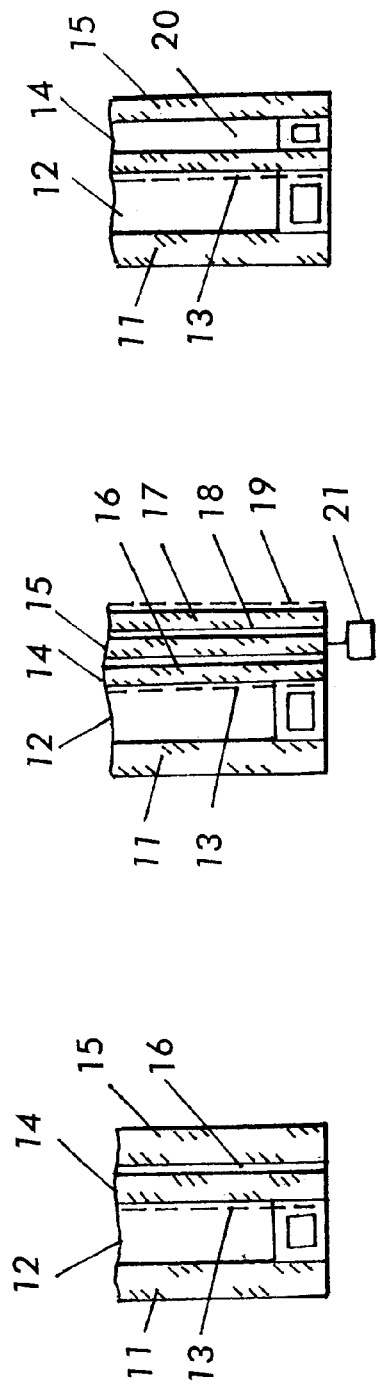

INSULATING GLASS ELEMENT FOR GLAZING A BUILDING

BACKGROUND OF THE INVENTION

The invention relates to an insulating glass element for glazing a building with a high degree of utilization of the solar radiation energy, the element comprising a clear glass pane and a further glass pane arrangement which is arranged at a distance from the clear plane.

German laid-open specification 28 29 523 describes a window-pane solar collector which comprises a crystal mirror glass pane arranged on the outside and a thicker, interior glass pane which is arranged at a distance from the mirror pane and the interior pane is colored green. The crystal mirror glass pane bears a selective coating on its inside which allows only the short-wave light radiation from the outside to pass through but does not emit long-wave thermal radiation to the outside. The intention for this arrangement is for the solar energy which strikes the window-pane solar collector to be converted into useable heat and to be discharged directly to the interior of the room without any transmission and storage thermal losses, or for that energy to be fed to a service water heating system.

DE 41 25 834 C2 from the same applicant describes such an insulating glass element which exhibits different transmission properties for the passage of solar energy radiation, depending on the positioning in relation to the radiation source. Depending on the positioning of the absorption pane in relation to the radiation source, this insulating glass element can be used in summer as a solar protection element with a low transmission of radiation energy and in the winter as a solar collector element with a high solar transmission of radiation energy. This known insulating glass element has a thermal insulation value of approximately $k=1.0$ $W/m^2K$ and is mounted in a window frame such that it can be rotated through 180°, so that, as desired, the insulating glass pane can point with one or other of its surfaces toward the outside of a room. In this way, the costs for the air-conditioning of rooms equipped with such insulating glass panes can be reduced both in winter and in summer.

The absorption pane of the insulating glass element is pointed outward when in the summer position. It is designed to be selective with regard to the predominantly non-visible region of the solar radiation, and it absorbs the non-visible components of the solar energy spectrum and converts them into thermal energy, which is dissipated to the external atmosphere convectively and via radiation. The entire energy transmissivity in this position is only about $g=0.35$ at the aforementioned k value.

In the winter position, the clear glass pane, which is free of iron oxide or has a reduced proportion of iron oxide, faces the outside and the selective absorption pane faces the interior. The solar radiation penetrates the clear glass facing the outside and strikes the selectively absorptive glass pane without any noticeable absorption losses. This glass pane converts approximately 50% of the solar spectrum, predominantly in the non-visible region, into long-wave thermal radiation, which is then almost exclusively radiated out into the interior of the room. This is impeded by a coating (low-E coating) that reduces the emission of long-wave thermal radiation and faces the interspace between the panes, and a noble gas filling in the interspace between the panes.

The overall energy transmissivity for solar irradiation is virtually $g=0.8$ in the winter position at the same k-value of approximately $k=1.0$ $W/m^2K$.

This concept may also be referred to as a solar diode and includes the mechanical reversal of the polarity of the radiation flow of the insulating glass element. It permits the thermal utilization of the irradiated solar energy potential in order to relieve the load on the heating balance in the winter months and the transitional months, and it prevents excessive solar irradiation in the summer months.

In spite of these known, advantageous effects of the insulating glass element corresponding to DE 41 25 834 C2, only the thermal insulation function, that is the thermal transmission coefficient of insulating glazing, is given any primary consideration and worth in conventional building technology in the case of glazed building outer surfaces, while the overall energy transmissivity, that is the solar utilization function of transparent glass areas, is neglected by comparison.

For large-area building glazing systems, that is for quasi-glazed structures, the glass industry has provided insulating glass elements with excellent properties with regard to the thermal insulation function, having k values of $k=1$ $W/m^2K$ for two-pane insulating glass elements and k values of $k=0.7$ or $0.5$ $W/m^2K$ for three-pane insulating glass elements.

These values are achieved by using single-sided or two-sided coatings which impede the emission of long-wave, solar radiation, and by an additional noble gas filling of the interspaces between the panes. In this case, however, considerable reductions in the g value, that is the overall energy transmissivity, are tolerated. In the case of three-pane insulating glass, only values of $g=0.48$ and below are still achieved, which means that more than 50% of the solar radiation striking the outer pane is rejected, and that energy is therefore no longer available for heating the interior.

Despite the energy losses because of neglecting to optimize the g value to the benefit of a slightly improved k value, for this insulating glass concept, the glass industry emphasizes as an advantage the fact that it is suitable both for thermal protection in the winter and for solar protection in the summer. In this case, however, it is overlooked that an improvement of the k value by 0.3 or 0.5 $W/m^2K$ in the case of a three-pane insulating glazing system, as compared with a two-pane system with a k value of $k=1$ $W/m^2K$, referring to the achievable energy gain, is virtually unimportant, in any case in the central European climate area, if it is offset against the loss of 20 to 30% in the solar irradiation rate. This is because, during the heating period in the winter and in the transitional months, this irradiation rate, even under diffuse solar irradiation, is on average 100 to 150 $W/m^2$ and, given direct irradiation, is 300 to 600 $W/m^2$, which may advantageously be used in a compensating manner for room heating. In this case, however, it is necessary to take into account the fact that the solar irradiation rate in the winter and transitional months is subject to large fluctuations during the day and, under conditions of severe cloud cover, can decrease to very low values.

In connection with DE 41 25 834 C2, it is already known that thermal comfort is influenced critically by the temperature of the wall surfaces in the room. Even when there is an adequate air temperature in the room, the temperature of the wall surfaces in the room must not fall below that of the air in the room if comfort is not to suffer. Given temperature deviations at partial areas of the room, such as the unavoidable ones in the case of glazed window fronts, and in spite of given, optimal thermal insulation values, comfort will already be noticeably impaired. Balanced wall temperatures are also an essential precondition for a comfortable room climate in order to avoid convective air flows. If balanced temperature is provided, room temperatures of 18° C. are already felt to be adequately comfortable, so that lowering the room temperature from the conventionally necessary interior temperatures of 22° C. to 18° C. provides a considerable saving of about 25% in heating costs.

SUMMARY OF THE INVENTION

The invention has the object of improving the thermal comfort of interiors having large window areas by utilizing the solar irradiation rate in the winter and transitional months in a sustained manner and largely independently of the current weather.

To achieve this object in an insulating glass element of the type mentioned above, the invention proposes a glass pane arrangement which is predominantly absorptive in the non-visible region of the solar radiation spectrum, has a high thermal storage capacity and has a surface facing the clear glass pane which is provided with a coating (low-E coating) that reduces the emission of long-wave thermal radiation and has a low emissivity of E=0.1, preferably E=0.03.

The invention is based on the consideration that it is necessary to find solutions for maximizing the thermal utilization of the irradiated solar energy potential in order to relieve the load on the heating balance in the winter and transitional months. The intention is for the solar energy passing through the insulating glass element and transmitted through the absorptive glass pane arrangement in long-wave thermal radiation to be consolidated and maintained for a relatively long time or stored directly in the pane element, in order to compensate not only for short-term but also for longer-lasting solar irradiation deficits. The high thermal storage capacity of the absorptive glass pane arrangement causes the temperature level of the glass pane facing the room to be maintained constant over a relatively long term. This causes a temperature level above that of the air in the interior of the room to be achieved in the glass pane facing the room. This not only increases the thermal comfort of the room but, by means of reducing the thermal transmission coefficient of the insulating glass element to a considerable extent, it improves the thermal balance of the interior.

The incident solar radiation penetrates the clear glass pane approximately without loss and strikes the absorptive glass pane arrangement facing the interior. Both the penetrating visible components and those components of the solar radiation spectrum which are absorbed by the absorptive glass pane arrangement and are converted into thermal energy benefit the interior, since the outwardly facing, emission-reducing coating of the absorptive glass pane arrangement prevents thermal radiation to the outside.

In addition, the outwardly facing surface of the absorptive glass pane arrangement can likewise be provided with a coating that reduces the emission of long-wave thermal radiation. This arrangement is suitable for increasing the storage capacity of the absorptive glass pane arrangement. As the coating reduces the emission of long-wave thermal radiation, the thermal radiation toward the interior is likewise reduced, and the heat stored in the pane is raised to a higher temperature level and is maintained at this level over an extended period of time.

In addition, this coating significantly reduces the emission capacity of the pane surface on the room side. As a result, in general terms, the thermal transmission coefficient of the insulating glass element can be reduced to a value of k=0.8 W/m²K. This is both advantageous in the winter position and in the summer position if the insulating glass element according to the invention is used in a window disclosed in DE 41 25 834 C2.

The coating may be applied by cathode sputtering. In that case, the coating must be arranged toward the gas-filled interspace, because if the coating is on the outside, it does not have adequate long-term stability. To apply a coating on the outside, this has to be carried out by pyrolytic glass coating.

The thermal utilization of the irradiated solar energy potential may additionally be increased if at least one surface of the clear glass pane is provided with an antireflection coating. The antireflection coating may be sputtered onto the surface facing the absorptive glass pane arrangement, as an interference coating, by a magnetron system, or may be applied to both sides in the dip process, and then the coating applied in the dip process is subsequently fired. Since the reflections at the glass pane on each side make up about 4% of the incident solar radiation in each case, using a single-sided coating, a solar radiation gain of about 4% may be achieved, and using a two-sided antireflection coating, a solar radiation gain of about 8% may be achieved.

While the gain of 7 to 8% provided by the iron-oxide free clear glass occurs primarily in the long-wave part of the solar spectrum, that is the non-visible part, the gain achieved by reducing the reflection lies primarily in the visible solar spectrum. Overall, using two-sided coating and iron-oxide free clear glass can achieve an additional gain of about 15% in the solar irradiation rate which strikes the absorption element unimpeded. The gain which may be achieved by reducing the reflection can, on the one hand, be used as additional gain in visible radiation for the lightness of the room, but on the other hand, by spreading the absorption bands of the absorptive glass pane arrangement, it can also be converted directly into thermal radiation.

Optimizing the thermal utilization of the solar energy input according to the invention may be achieved in a simple and extremely advantageous way by simply increasing the thickness of the absorptive glass pane arrangement, which is preferably about at least twice as thick as the clear glass pane. If the clear glass pane is 3 to 5 mm thick, the absorptive glass pane arrangement can advantageously be 6 to 12 mm thick. The corresponding increase in the volume of the absorptive glass pane arrangement, with a constant size of the radiation area of the glass pane, achieves considerable thermal charging of the absorptive glass pane arrangement, enabling compensation for the fluctuations in the solar radiation with a partially clouded sky, or temporary temperature deficits on that surface of the pane which faces the room.

Using the absorptive pane arrangement with a high thermal storage capacity of the invention, the solar radiation energy which falls into the room and is converted into heat in the absorptive glass pane arrangement is maintained and stored in consolidated form here over an extended time period, because of the increased mass, instead of being directly incident on the extensive wall surfaces of the interior, which are generally not optimally equipped for the absorptive uptake of long-wave thermal radiation.

In spite of temporary fluctuations in the intensity of the irradiation, an increased temperature level in that surface of the pane which faces the room is obtained so that even with low, diffuse daylight irradiation, even with a northerly aspect of the window, the surface of the pane exhibits temperature values which lie above those of the room temperature.

The thermal storage and buffer concept realized by increasing the mass of the panes in the absorptive glass pane arrangement thus has an advantageous effect in setting a conducive and comfortable room climate. Under daylight conditions, but also as a result of the continuous maintenance of a temperature level of the surfaces of the absorptive glass pane arrangement that face the room above the internal temperature of the room, the storage and buffer concept according to the invention promotes an effect which directly reduces the heat transmission losses, that is the effective k value of the insulating glass element. This is because if the surface temperature of the absorptive glass pane arrangement that faces the room reaches the inner temperature of the room, the effective k value falls to a value of k=0. This produces a thermal barrier, since the outwardly directed heat flow, characterized by the k value of the insulating glass element, namely k=1.1 W/m$^2$K, is compensated for by the solar irradiation stored by the absorptive glass pane arrangement.

If the temperature of the absorptive glass pane arrangement rises above the inner temperature of the air in the room, then the solar radiation energy absorbed and stored by the pane comes directly to benefit the heating of the interior of the room, as thermal radiation.

Given clear solar irradiation, even in winter, surface temperatures of the absorptive glass pane arrangement up to 45° C. are reached, that is temperatures of thermal emission which correspond to a moderately radiating tiled stove.

The storage and buffer concept according to the invention leads to a beneficial yield from the irradiated solar energy which has previously not been achieved. Depending on the g value of the insulating glass element, the yield obtained for room heating is composed of the solar-generated thermal irradiation or convective thermal dissipation of the absorptive glass pane arrangement to the interior and of the direct irradiation, passing through the insulating glass pane, of the visible region of the solar spectrum. The short-wave radiation of the visible region contributes to the heating of the interior, when there are predominantly absorptive wall surfaces. Only a slight proportion of the short-wave radiation is able to leave the room again via the pane area. The insulating glass element according to the invention is non-transparent to long-wave thermal radiation.

The solar benefit to be achieved overall as a result of the storage and buffer concept according to the invention, as explained and presented above, becomes clear to its full extent if this benefit is compared with the performance of conventional insulating glass elements.

First, the gross level of the solar irradiation as a result of using a clear glass pane is 7–8% higher. If a three-pane insulating glass element is assumed, then the reflection and absorption losses in the center pane and its additional coating have to be accepted, before the radiation strikes the inner pane. This already characterizes the distinctly reduced g value of a conventional insulating glass element.

By comparison, the known insulating pane arrangement having the highest performance in this regard, with a three-pane construction with a krypton filling of the interspaces and two or three low-E coatings, has a k value of only k=0.4. The g value of this pane element then has values below g=0.5.

The considerable utilization losses of the solar irradiation are mainly caused by the restricted absorption capacity of the float glass pane facing the room. Since this pane is able to absorb only 2 to 4% of the incident solar radiation, only a fraction of the incident solar spectrum can also be transmitted in long-wave thermal radiation. A high proportion of the solar irradiation, if it is not absorbed by the surfaces of the interior, is therefore able to emerge unused through the glass areas of the windows, again following multiple reflections.

This can be demonstrated directly, since for observers standing outside, the objects in the room can be seen from the outside through the glazed window areas.

If there are light reflective blinds or curtains, in this way up to 50% of the solar radiation irradiated into the room can be radiated to the outside again through the glazed outer areas without any thermal benefit.

Because of the increased mass and therefore the thermal storage capacity of the absorptive glass pane arrangement, in conjunction with a clear glass pane, this produces a two-pane insulating glass element having a thermal transmission coefficient of approximately k=1.1 W/m$^2$K. As a result, even in the case of a very low or diffuse irradiation or in the case of irradiation deficits caused by occasional cloud cover, overall, under daylight conditions, an essentially constant surface temperature of the absorptive glass pane arrangement is achieved, which temperature is at least equal to the temperature of the air in the interior or above it. As a result, the insulating glass element according to the invention almost constantly has an effective k value of k=0.

In order to achieve the most beneficial values for transmissivity for visible light and the absorption in the non-visible region of the solar radiation spectrum, the clear glass pane advantageously has an extremely low proportion of iron oxide, and the absorptive glass pane arrangement is at least partly formed as a so-called green glass pane. In particular, the absorptive glass pane arrangement can be formed as a solid green glass pane, that is as a glass pane with a high proportion of iron oxide.

According to another advantageous embodiment, the absorptive glass pane arrangement can be formed as an at least two-layer laminated glass with a PVB intermediate film between the glass layers.

Use of an absorptive glass pane arrangement formed as a laminated glass is advantageous, since it provides an additional soundproofing effect. This soundproofing effect can be further improved by using an intermediate film with a greater thickness than usual, of 1 to 2 mm, for example, and/or by means of specific film compositions. In addition, laminated glass increases the security of the glazing against break-ins, by means of the insulating glass element according to the invention.

In addition, it is possible to expand the level of absorption and the remaining optical transparency and the storage capacity of the absorptive glass pane arrangement formed as laminated glass by incorporating molecular layers or pigmentations in the transparent intermediate film. These cause a sharper separation between the short-wave, visible and the longer-wave, non-visible region of the solar spectrum. In addition, this achieves absorption of the UV component of the solar radiation, with the advantage of effective UV radiation protection for materials in the interior of the room. An additional thermal input into the absorption element of approximately 5% can be achieved. Furthermore, it is also possible to allocate the absorptive function to the glass pane arrangement on its own or to a major part to the intermediate film.

For reasons of safety in the event of fracture, it is advantageous to provide at least one glass pane of the insulating glass element, preferably the absorptive glass pane arrangement, with at least one glass pane or glass layer of toughened or partly toughened glass, which is largely insensitive to temperature differences.

In order to achieve the highest possible thermal storage capacity of the absorptive glass pane arrangement, the arrangement can comprise two spaced-apart glass panes and a fluid sealed in between them. The arrangement is transparent to visible light and has a high thermal storage capacity. It is possible for the fluid to consist, for example, of water, particularly colloidally crosslinked water, which has about five times the specific heat of glass. The thermal storage capacity of the liquid can be still further increased by providing a high proportion of dissolved metal salts. It is possible for these metal salts to be selected such that they also contribute to the absorption of the non-visible region of the solar radiation spectrum. The liquid can also consist of a homogeneously dispersed hydrogel of high viscosity.

The thermal storage and buffering according to the invention of the solar radiation energy converted into heat may in general be enhanced by filling the interspace between the clear glass pane and the absorptive glass pane arrangement with a noble gas, preferably krypton, which also reduces the thermal radiation to the outside. This makes it possible for the width of the interspace then advantageously to be about 10 mm. Use of a 5 mm thick clear glass pane, a 12 mm thick absorptive glass pane arrangement and a gap width of 10 mm, for example, provides an entirely conventional thickness of 27 mm for the insulating glass element. Insulating glass elements of this thickness and design may still readily be used in windows of the type described in DE 41 25 834 C2.

In the case of a krypton filling and a low-E coefficient of 0.03, the insulating glass element achieves a k value of k=1 W/m²K.

The storage concept according to the invention may be supplemented in an advantageous way by being combined with electrical resistance heating of the absorptive glass pane arrangement.

Virtually all low-E coatings, as well as coatings applied by cathode sputtering and pyrolytically applied coatings, are electrically conductive. They may be heated electrically as surface resistance layers and, to this extent, can be used as surface radiation heating systems.

It is likewise possible, as already known in the case of heating motor-vehicle rear glazing systems, to print conductor systems onto absorptive insulating glass panes by the screen printing process. Alternatively, as provided in the case of heatable laminated windshields, a barely visible network of lines made of fine wires can be integrated into the intermediate film in the absorptive laminated glass construction.

This network of lines may also be applied to an additional glass pane which faces the room and has a minimum spacing of 15 mm from the absorptive glass pane arrangement.

The inventive concept resides in the idea of coupling the electrical heating of the absorptive glass pane arrangement with the irradiated and stored solar energy in a compensatory manner. This is done by a temperature sensor integrated in the absorptive glass pane arrangement always switching on the electrical heating when the temperature of the solar-heated inner pane does not reach a predefinable temperature level, in particular the temperature level of the air in the interior of the room, or when it falls to a value below this level at times.

This constantly equalizes over time the temperature of that surface of the absorptive glass pane arrangement which faces the room with the respective interior temperature of the room, so that a constant effective k value of k=0 is kept constant over the entire heating period.

Equally, as a result the advantages in terms of the room climate are also kept constant over the heating period with a minimum expenditure of energy, since the electrical pane heating always compensates only for the difference between the solar-heated inner pane and the interior temperature of the room. In addition, the room temperature can then advantageously be reduced to 18 to 20° C. without any penalties in terms of comfort.

Flexible, demand-related temperature regulation of the window-pane heating makes it possible, particularly for a relatively large portion of window area in the room outer surfaces, to dispense with conventional heating systems, as those systems cause comparatively far higher operating and maintenance costs, despite the necessary investment costs.

Assuming a good insulation standard for the other room and building outer surfaces, the highly insulated insulating glass pane arrangement that absorbs and stores the solar radiation, in a compensatory coupling with the electrically supplied flat heating system integrated into the absorptive glass pane arrangement in the manner illustrated, provides an excellent and extremely cost-effective concept for heating in the winter and, in connection with the diode effect of a rotatable window system, the air-conditioning of a low-energy building in the summer as well.

If the temperature of the absorptive glass pane arrangement is kept at a temperature that is higher than the room temperature by electrical heating, the insulating glass element can advantageously be used as a radiator for controlling the temperature in the room.

A differential electronic control unit, which takes into account the pane temperature and the room temperature to be entered, makes it possible to achieve a regulation system which is matched to time-based requirements, such as the heating duration and overnight reduction.

The advantages of this concept reside in its economy, with the savings in energy, operating and maintenance costs, and particularly in savings in investment costs, which add up.

However, with regard to providing a conducive radiator climate in the interiors, there is also significant gain in living comfort and living hygiene.

Finally, the ecological benefit of this concept deserves attention, since it is possible to utilize the solar irradiation for the air-conditioning of the building in am optimum way, even in central European areas.

Other objects and features of the invention are described below using a number of exemplary embodiments illustrated in the drawings.

BRIEF DESCRIPTION OF THE DRAWINGS

FIG. 1 shows a cross section through a window having an insulating glass element according to a first embodiment of the invention, FIG. 2 shows a partial sectional view of an insulating glass element according to a second embodiment of the invention, FIG. 3 shows a partial sectional view of an insulating glass element according to a third embodiment of the invention, and FIG. 4 shows a partial sectional view of an insulating glass element according to a fourth embodiment of the invention.

DESCRIPTION OF PREFERRED EMBODIMENTS

A window having an insulating glass element according to the invention is illustrated schematically in cross section in FIG. 1. It has a conventional type of frame 1 fixed to the building. A casement frame 2 is fitted into an appropriate cut-out in the frame 1 and is pivotably mounted on the frame 1 via a pivoting hinge 5, e.g., a conventional hinge. The casement frame 2 rests with a double stop on the frame 1.

An insulating glass element is comprised of a clear glass pane 11 and of a green glass pane 4 which are arranged spaced apart a distance. It is absorptive, primarily in the non-visible region of the solar radiation spectrum. It is surrounded by an insulating glass element frame 3. A pivot hinge 6, not illustrated in detail, is arranged on the vertical mid-axis of the insulating glass element 4, 11. The insulating glass element 4, 11, together with the insulating glass element frame 3, can be turned through 180° in the casement frame 2, after a locking means (not illustrated) has been released, and the glass element can be locked again.

In the region of one side face of the insulating glass element frame 3, on a circumferential projection of the frame 1, there is a circumferential seal 7, on which the insulating glass element frame 3 bears when the window is closed. This ensures a seal. The seal 7 ensures complete sealing of the window casement without requiring any additional seal between the insulating glass element frame 3 and the casement frame 2. Nevertheless, in specific applications it may be expedient to arrange further seals 8, 26 between the insulating glass element frame 3 and the window casement frame 2 and/or between the frame 1 and the window casement frame 2. But this is not necessary in most applications.

The outer faces 9 of the insulating glass element frame 3, which are parallel to the pivoting axis running through the pivot hinge 6, are rounded off with a radius which corresponds to their distance from the pivoting axis. The corresponding inner faces 10 of the casement frame 2 are likewise rounded off, so that the insulating glass element frame 3 can be fitted into the casement frame 2 with little play. The insulating glass element frame 3 extends flush with the frame 1 on the inside, so that both the frame 1 and the casement frame 2 may be covered with a single strip 27 (paneling) made of metal or plastic sections. This enables repeated painting to be dispensed with. In a conventional pivoting casement window, both the frame and the pivoting casement would have to be paneled separately for this purpose, the latter being paneled on both sides.

The green glass pane 4 is at least about twice as thick as the clear glass pane 11 and is comprised of toughened or partly toughened glass. The thickness of the clear glass pane 11 is preferably between 3 and 5 mm, while that of the green glass pane is preferably between 6 and 12 mm. The clear glass pane 11 is spaced from the green glass pane 4 preferably about 8 to 12 mm, and the interspace 12 formed in this way and sealed off by means of conventional spacers is filled with a noble gas, preferably krypton.

A coating 13 (low-E coating) is arranged on that surface of the green glass pane 4 which faces the interspace 12 to reduce the emission of long-wave thermal radiation.

The position of the insulating glass element 4, 11 illustrated in FIG. 1 is the winter position, in which the heat stored in the green glass pane 4, which has a high thermal storage capacity because of its thickness, is radiated toward the interior of the room. As a result, the temperature of the interior and/or the comfort is increased. The coating 13 has the effect that the heat stored in the green glass pane 4 is essentially radiated toward the interior of the building.

In the summer position, with the glass element 4, 11 rotated through 180° around the axis 6, the heat stored in the green glass pane 4 is essentially radiated to the outside or dissipated convectively, so that the dissipation of heat to the interior is reduced considerably.

To use insulating glass elements with the highest possible thermal storage capacity, glass thicknesses for the absorptive glass pane arrangement are used which can no longer be produced cost-effectively as a solid glass pane. For this reason, the embodiment according to FIG. 2 comprises a two-layer laminated glass with a PVB intermediate film 16 between the glass layers 14, 15. Both the clear glass pane 11 and the glass layers 14, 15 can have the same thickness of 5 mm, for example, so that with a spacing of 10 mm between the panes 11, 14 and a thickness of the PVB intermediate film of 1 mm, the insulating glass element has an overall thickness of 25 mm. The arrangement of the coating 13 that reduces the emission of long-wave thermal radiation is the same as in the embodiment of FIG. 1.

The comparatively thick PVB intermediate film 16, which exceeds the conventional thickness dimension of about 0.75 mm, additionally improves the soundproofing function of this insulating glass element and that is further significantly increased as a result of the film being heated by the heated glass.

The embodiment of FIG. 3 has a three-layer laminated glass comprising the glass panes 14, 15, 17 and the PVB intermediate films 16, 18. The total thickness of this arrangement is the same as in the embodiment of FIG. 2. Molecular layers or pigmentations can be introduced into the intermediate films 16, 18 as an absorptive medium for the longer-wave, non-visible spectral region and/or UV proportion of the sunlight. In this embodiment, an additional coating 19 that reduces the emission of long-wave thermal radiation is arranged on the outwardly directed surface of the absorptive glass pane arrangement 14, 15, 16, 17, 18. The coatings 13, 19, prevent radiation of the stored heat in both directions. This causes an increase in the temperature of the absorptive glass pane arrangement and storage of the heat over a prolonged period of time, but in particular a considerable reduction in the k value of this glass pane arrangement.

In the embodiment according to FIG. 4, the absorptive glass pane arrangement comprises two spaced-apart glass panes 14, 15 and an interspace that is filled, for example, with a fluid 20 that is transparent to visible light and has a high thermal storage capacity. If water or colloidally crosslinked water is used for this fluid 20, the thermal storage capacity can be virtually tripled with the same element dimensions, since the specific heat of water is more than five times that of glass. If specific metal salts are dissolved in the water, the thermal capacity can be further increased, and the absorption in the liquid can be matched to specific wavelength regions of the radiation spectrum.

The fluid 20 may also comprise a homogeneously dispersed hydrogel of high viscosity, in order to reduce the effects of the hydrostatic pressure in tall insulating glass elements.

Even if the absorptive glass pane arrangements of FIGS. 1 to 4 do not have any coating that reduces the emission of long-wave thermal radiation, the inventive advantageous aspect of thermal storage in the absorptive glass pane arrangement is provided, since the increased thermal storage capacity is maintained. In this case, although the insulating glass element according to the invention does not act as a solar diode which can be moved into either a summer position or a winter position by being pivoted through 180°, in this case it provides a simplified window construction without any pivoting capability. In comparison with normal windows with insulating glass panes without thermal storage, the invention ensures improved comfort even during brief fluctuations in the solar irradiation.

The electrically conductive coatings 13, 19 can be used as electrical resistance surface heating systems for the insulating glass element according to the invention. Alternatively, electrical resistance conductors can be applied to the absorptive glass pane arrangement 4; 14, 15, 16; 14, 15, 16, 17, 18 in the screen printing process, or electrical resistance heating wires (not illustrated) can be inlaid in the intermediate film(s) 16, 18, of the absorptive glass pane arrangement 14, 15, 16; 14, 15, 16, 17, 18 formed as a laminated glass. The resistance surface heating system may also be arranged on an additional glass pane which faces the room and has a minimum spacing of 15 mm from the absorptive glass pane arrangement 14, 15, 16; 14, 15, 16, 17, 18.

A temperature sensor 21 on the absorptive glass pane arrangement 14, 15, 16, 17, 18 switches on the heating system 13, 19 when the temperature of the absorptive glass pane arrangement falls to a preset temperature, in particular to or below the internal room temperature, or does not reach that temperature.

If the temperature of the absorptive glass pane arrangement is kept to a temperature above the room temperature by the electrical heating system, the inventive insulating glass element may be used as a radiator for controlling the temperature of the room.

Regulating the temperature by means of a differential electronic control unit (not illustrated) may be carried out in two stages. A basic stage may be provided, which is based only on compensating for the thermal transmission loss rate existing in each case, in order to maintain the k value constant and equal to zero over time.

In the second stage, a higher temperature level for heating the room may be set, at the same time taking into account the correspondingly rising transmission losses. In this case, both stages are coupled to the respective global solar energy proportion entering the room, which results from the direct irradiation, the diffuse irradiation and the reflective irradiation. In addition, the internal heat sources in the room are taken into account.

An electrically heatable insulating glass element of this type is particularly suitable as an apron wall surface element in floor-to-ceiling glazing. The apron wall pane element can be constructed as a pivoting element with a summer and winter position and can have an absorptive pane arrangement having a higher absorptivity of about 70% of the incident solar irradiation, including visible components. This apron wall pane element is then considerably less transparent than the glazing elements located above it but, in the case of apron wall glazing systems as part of floor-to-ceiling glazing elements, a high incidence of light is not necessary.

The electrical resistance heating system provides an extremely low energy demand, even if the inventive insulating glass element is used as the sole room-heating element. One precondition for this is the optimal utilization of the solar irradiation by means of the highly selective absorptive pane construction with a high thermal storage capacity.

In particular for low-energy houses with a high standard of insulation, the insulating glass element according to the invention can advantageously be used as the sole room-heating concept.

Using the invention as a pure radiation heating system, in each case controlled flexibly on the basis of demand, produces an extremely efficient and cost-effective heating system with the advantage of providing a comfortable and physiologically conducive room climate.

Although the present invention has been described in relation to a particular embodiment thereof, many other variations and modifications and other uses will become apparent to those skilled in the art. It is preferred, therefore, that the present invention be limited to not by the specific disclosure herein, but only by the appended claims.

What is claimed is:

1. An insulating glass element for building glazing, comprising:
   a clear glass pane; and
   an absorptive assembly spaced at a distance from the clear glass pane,
      the absorptive assembly being absorptive in the non-visible region of the solar radiation spectrum but substantially transmissive to the visible region of the spectrum and having a high thermal storage capacity;
   the absorptive assembly being comprised of:
      two spaced-apart glass panes;
      a fluid which is transparent to visible light and has a high thermal storage capacity sealed between the glass panes,
      one of the spaced-apart glass panes having a surface facing the clear glass pane with a coating thereon that reduces the emission of long-wave thermal radiation.

2. The insulating glass element of claim 1, wherein the coating is a low-E coating.

3. The insulating glass element as claimed in claim 1, wherein the clear glass pane is substantially free of iron oxide.

4. The insulating glass element as claimed in claim 1, wherein the absorptive assembly includes at least one glass pane of toughened or partly toughened glass.

5. The insulating glass element as claimed in claim 1, in which the fluid consists of water.

6. The insulating glass element as claimed in claim 5, wherein the water has a high proportion of dissolved metal salts.

7. The insulating glass element as claimed in claim 1, wherein the fluid consists of a homogeneously dispersed hydrogel of high viscosity.

8. The insulating glass element as claimed in claim 1, wherein the clear glass pane and the absorptive assembly are spaced apart about 8 to 16 mm and that space is filled with a noble gas.

9. The insulating glass element as claimed in claim 8, wherein the gas is krypton.

10. The insulating glass element as claimed in claim 7, wherein the outwardly facing surface of the absorptive assembly is provided with a coating adapted for reducing the emission of long-wave thermal radiation.

11. The insulating glass element as claimed in claim 10, in which the inward surface facing the gas-filled space is coated by means of cathode sputtering, and the outwardly facing surface is coated pyrolytically.

12. The insulating glass element as claimed in claim 1, wherein the clear glass pane has at least one surface provided with an antireflection coating.

13. The insulating glass element as claimed in claim 12, in which the antireflection coating is sputtered onto the surface of the clear glass pane facing the absorptive assembly, as an interference coating, by means of a magnetron system.

14. The insulating glass element as claimed in claim 12, wherein the antireflection coating is applied to both surfaces of the clear glass pane in a dip process and is then fired.

15. The insulating glass element as claimed in claim 1, further comprising an integrated, flat heating system.

16. The insulating glass element as claimed in claim 15, wherein the flat heating system is integrated into the absorptive assembly.

17. The insulating glass element as claimed in claim 15, further comprising an additional glass pane which faces the room and has a minimum spacing of 15 mm from the absorptive assembly and the heating system being arranged on the additional glass pane.

18. The insulating glass element as claimed in claim 15, wherein electrical surface resistance heater comprises a coating that reduces the emission of long-wave thermal radiation.

19. The insulating glass element as claimed in claim 16, further comprising a temperature sensor on the absorptive assembly connected to switch on the heating system when the temperature of the absorptive assembly falls to a preset temperature.

20. The insulating glass element as claimed in claim 1, wherein the absorptive assembly is at least about twice as thick as the clear glass pane.

21. The insulating glass element as claimed in claim 20, wherein the clear glass pane is 3 to 6 mm thick and the absorptive assembly is 6 to 12 mm thick.

22. The insulating glass element as claimed in claim 3, in which the absorptive assembly comprises a solid green glass pane.

23. The insulating glass element as claimed in claim 1, in which the absorptive assembly comprises a solid green glass pane.

* * * * *